April 8, 1958  G. W. STAATS  2,830,208
STATOR COIL TRANSPOSITION
Filed March 6, 1957
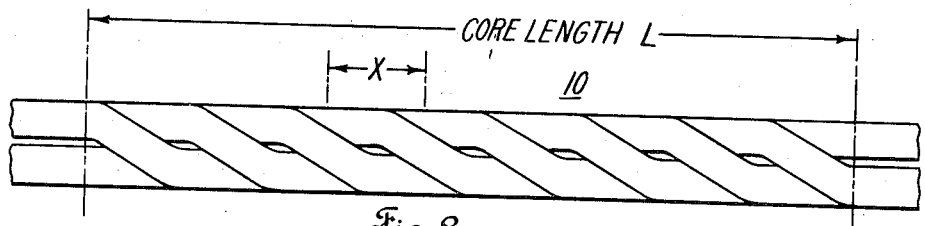
Fig. 2
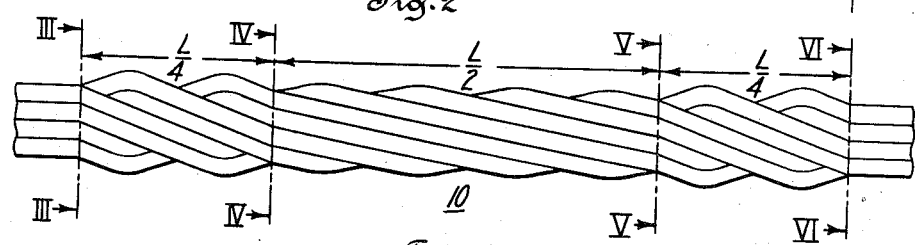
Fig. 1
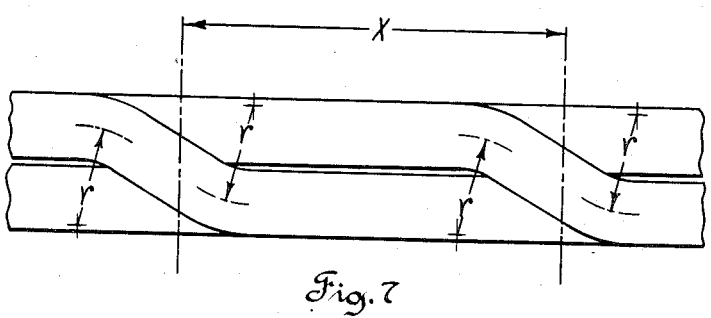
Fig. 3  Fig. 4  Fig. 5  Fig. 6
Fig. 7
Inventor
Gustav W. Staats
By W. Edward Foerch, Jr.
Attorney

2,830,208

STATOR COIL TRANSPOSITION

Gustav W. Staats, Milwaukee, Wis., assignor to Allis-Chalmers Manufacturing Company, Milwaukee, Wis.

Application March 6, 1957, Serial No. 644,344

12 Claims. (Cl. 310—213)

This invention relates generally to windings for dynamoelectric machines, and more particularly to a transposition arrangement of the conductor strands forming the armature winding of a dynamoelectric machine.

It is well known that current flowing in the conductors of an armature winding of a dynamoelectric machine causes magnetic lines of flux to be set up around the strands forming the conductors. Because the reluctance across the core slot containing the conductor is many times greater than the reluctance through the iron, these magnetic flux lines around the conductor tend to follow a path through the iron around the bottom of the slot, or a path of least reluctance, thereby crossing the slot only once. The increase of the transverse field of the slots is approximately uniform from the bottom of the slots to the surface. This unequal flux density which exists throughout the core length, and also to a lesser extent at the end winding portions, produces unequal strand reactance and strand voltages which in turn cause eddy currents within the winding.

In order to reduce eddy currents to a minimum, conductor strands for windings have heretofore been transposed within the score slot by various arrangements. For a 180 degree transposition of the strands in the core slot the strand positions at the ends of the slot are reversed; the strand voltages due to variations of the end flux are substantially equalized, but the strand voltages due to variations of the slot flux are not sufficiently equalized. For a 360 degree transposition in the slot each strand occupies all positions for an equal distance; the strand voltages in all strands due to the core flux are substantially equal, but the strands are in the same position at the ends of the slot. Therefore, while eddy currents between strands due to core flux are eliminated, differences in strand voltages due to variations in the end flux are unaffected for a 360 degree transposition. For a 540 degree transposition in the slot, the strands are arranged to occupy each strand position for an equal length of the core flux, and also the strands are transposed to occupy reversed top to bottom positions at the two ends of the core. Thus, a 540 degree transposition arrangement substantially eliminates strand voltages caused by flux variations both throughout the core and end winding portions of the conductor. A 540 degree transposition arrangement is therefore the most desirable transposition arrangement.

One arrangement which effectively places each conductor in each slot position for an equal length of the core slot and which reverses the strand positions at the ends, that is, rotates the end strands 180 degrees, is a 540 degree transposition which uses unequal rates of single strand transpositions and unequal distances between transpositions along the core length, as shown in Ringland, S. N. 578,520. By this arrangement, the conductor strands are transposed through 180 degrees in each of the first and fourth quarters of the core length and through 180 degrees through the center half (second and third quarters) of the core length. However, while this arrangement produces an effective 540 degree transposition, it requires a considerable core length to permit the mechanical crossovers to be made not only because of the greater number of crossovers but also because the distance required for the shortest of the unequal distances between crossovers is limited by the minimum bend radius which is possible in the conductor strands.

For example, for a 175,000 kva. generator, the stator or armature core slots will ordinarily contain two conductors. The conductor at the top or mouth of the slot may comprise eighty strands arranged in two rows of forty strands each, and the conductor at the bottom of the slot may comprise fifty-six strands arranged in two rows of twenty-eight strands each. For the eighty strand conductor with 540 degree single strand transposition there will then be 120 mechanical crossovers of the conductor strands along the core length at the top and bottom of the conductor, since each of the eighty strands is rotated one and one-half times.

In addition, since unequal rates of single strand transpositions are used, the distances between transposition crossovers are also unequal along the core length. As transpositions are through 180 degrees over each of the first and fourth quarters and through 180 degrees over the center half (second and third quarters) of the core length, the axial distance between crossovers in the first and fourth quarters is necessarily half as great as the axial distance between the crossovers in the center half of the core length. Thus, as the minimum axial distance required for each mechanical crossover is limited by the bend radius which can be made in the strand without damaging the strand insulation or the strand itself to approximately one and one-half times the width of the strand, the minimum distance possible between crossovers in the first and fourth quarters determines a minimum possible overall core length and the minimum distance between crossovers in the center half of the core slot is limited to twice the distance permitted by the bend radius. Therefore, when shorter core lengths are desired, the crossover distances present a formidable problem.

According to the present invention, the strand conductors are transposed in a novel manner by rotation such that for a given conductor a 540 degree transposition is accomplished in the distance required for a 360 degree transposition. According to the present invention, each row of strands contains an even number of conductor strands and the conductor strands are arranged as follows. Over the first quarter of the core length, the strands are transposed uniformly by rotation through 180 degrees. However, instead of forming each strand transposition crossover a single strand in depth as is usual, the crossovers during the first quarter of the core length are at a rate of two strands in depth for each crossover. Over the combined second and third quarters or center half of the core slot length, the strands are transposed uniformly by rotation through 180 degrees and at the usual transposition rate of a single strand in depth for each crossover. During the final quarter of the core slot length the strands are transposed uniformly by rotation through 180 degrees and at the transposition crossover rate two strands in depth for each crossover.

As two strands in depth per crossover occur over the first and fourth quarter of the core slot length, the number of crossovers are now half as many during these quarters as there would be if the usual single strand crossovers were used. Instead of forty crossovers at the top and bottom of the conductor being required to transpose through 180 degrees in each of the first and fourth quarters of an eighty strand conductor having 540 degree transposition, only twenty transposition crossovers are now required. Thus using the present invention the total number of crossovers at the top and bottom of the conductor is reduced from 120 to 80 for an eighty strand conductor and the overall length of the core may be correspondingly reduced.

In addition, while there are forty single strand crossovers in the center portion of the slot and only twenty in each of the end portions, the center portion has twice the axial length of each of the end portions. Therefore, the distances between transposition crossovers are now equal and may be a minimum over the entire length of the core. The number of crossovers and the total core length required for a 540 degree transposition is now the same as the number of crossovers and distance required for a 360 degree transposition, thus permitting the core length to be reduced from that formerly required.

The method described is superior to the obvious solution of taking two strands in depth throughout the length of the core for reducing the number of crossovers and transposing by means of a 540 degree transposition with unequal crossovers in that with the present arrangement each pair of strands taken together at the first and last quarter of the core length is transposed with respect to each other. This transposition of pairs of strands is effected by employing single strand crossovers in the second and third quarters.

It is therefore an object of the present invention to provide an improved transposition arrangement for the conductor strands of the armature winding of a dynamoelectric machine.

Another object of this invention is to provide an improved 540 degree transposition arrangement in which the minimum length of the core required for the transposition is reduced.

Another object of this invention is to provide an improved 540 degree transposition in which the distances between transpositions are equal.

Another object of this invention is to provide an improved 540 degree transposition in which the number of transposition crossovers is reduced.

Another object of this invention is to provide an improved 540 degree transposition arrangement in which strands are transposed in pairs and the strands of each pair of strands are transposed with respect to each other.

Other objects and advantages will be apparent from the following description taken in connection with the accompanying drawing, in which:

Fig. 1 is a longitudinal view illustrating the transposition arrangement of the present invention;

Fig. 2 is a top view of Fig. 1;

Fig. 3 is a sectional view illustrating the strand position along line III—III of Fig. 1;

Fig. 4 is a view illustrating the strand position along line IV—IV of Fig. 1;

Fig. 5 is a view illustrating the strand position along line V—V of Fig. 1;

Fig. 6 is a view illustrating the strand position along line VI—VI of Fig. 1; and Fig. 7 is an enlarged view illustrating the mechanical crossovers of the strands shown in Fig. 2.

Referring to the drawing, Fig. 1 illustrates a portion of a conductor forming an armature winding of a dynamoelectric machine. The transposition arrangement is illustrated for an eight strand conductor having a length L and arranged in two columns within a core slot (not shown) as is conventional. Each strand has a thin wrapping of insulation (not shown) and the conductor is further insulated from the core slot. The strands extend from the core slot at the ends of the slot to form the end winding portion of the winding and the strands are electrically connected together during construction of the machine to form the conductor.

The position of each strand in the slot is changed throughout the length of the slot. The strands which are identified as strands A through H of conductor 10 are transposed by rotation. The strands in one column move progressively upward and the strands in the other column move progressively downward. When a strand has moved sufficiently to clear the last strand in the other column, the strand crosses over to the other and follows the last strand in that column as it moves around in the slot.

At one end of the core slot the strands are arranged in a relative position as shown in Fig. 3. A clockwise rotation of the strands is illustrated, however, the rotation may be in a counterclockwise direction. Over the first quarter of the length of the slot length the strands are transposed by rotation through 180 degrees. Further, the strand crossovers at the top and bottom of the conductor are two strands in depth instead of the usual crossovers of a single strand in depth.

At the end of the first quarter of the length of the core slot the pairs of strands have been rotated through 180 degrees, as shown in Fig. 4. However, because the strands were transposed two strands for each transposition, there has been no transposition of the strands forming each pair. Thus, strand A which may be considered at the top of the slot side of strand B at the core end is also on the top of the slot side of strand B at the end of the first quarter of the core slot.

Over the middle half of the core length, that is, the second and third quarters of the length of the core slot, the strands are transposed uniformly through 180 degrees. In this second portion of the slot length the strands are transposed with a single strand in depth for each crossover at the top and bottom of the conductor in the normal manner. At the end of the third quarter of the length, the strand position is as illustrated in Fig. 5.

It will be noted that by transposing the strands a single strand in depth for each crossover in this portion of the core length the strands forming each pair of strands have now been transposed with respect to each other. Thus, at the end of the third quarter of the core length strand A is no longer on the top of the slot side of strand B. Now strand A is at the bottom of the slot side of strand B, and the strands which were transposed together in the first quarter of the slot length as a pair have been transposed with respect to each other.

Over the fourth quarter of the core slot length the strands are again rotated through 180 degrees. As in the first quarter, the strands are transposed with two strands in depth for each crossover. The relative position of the strands at the second end of the core slot is as shown in Fig. 6. In transposing two strands in depth, the strands forming each pair are not transposed with respect to each other. Thus, strand A which was on the bottom of the slot side of strand B at the end of the third quarter of the slot length is also on the bottom of the slot side of strand B at the end of the fourth quarter of the slot length.

As the first and third portions of the core slot are half as long as the second portion, and as there are half as many crossovers in the first and third portions as there are in the second portion, then it follows that the distance between crossovers is equal along the entire length of the core slot.

Since the strands occupy substantially the same positions in the first and third portions of the slot, that is, half of the slot positions for half of the slot length and the strands occupy the remaining slot positions in the second portion, each strand has occupied each slot position for substantially equal portions of the axial length of the core. Also, since each strand has rotated through 540 degrees, the relative position of the strands in the end winding portions is reversed.

Although transposing strands in pairs in the first and fourth quarters produces in effect a double thickness strand, the strands comprising the pairs are transposed with respect to each other in the single strand depth crossover portion of the slot length. Differences in strand voltages between strands forming pairs are substantially balanced by the present arrangement.

In forming crossovers, two strands in the first and third portions of the slot length, and a single strand in the second or middle portion, in each column move sufficiently past the last strand in the other column to permit the strands or strand to cross from one column to the other and follow the last strand in the other column as it rotates through the various slot positions. As illustrated in Fig. 7, a bend having a radius $r$ is made in the strands to cause the strand to cross over from one column to the other. This radius is limited by the minimum bend radius which may be made in the strand without damaging the insulation or the strand itself. After the strand has passed over to the other column, a second bend with a radius limited in the same manner as the first bend radius is made in the strands to return the direction of travel to follow the last strand in the second column.

The distance X between crossovers is still limited with the present transposition arrangement by the minimum bend radius which may be put in the strand. However, as the distance between crossovers is equal along the entire length of the core slot, the minimum bend radius may now be used for each bend rather than for only a portion of the slot length as in the case of a 540 degree transposition arrangement using single strand crossovers along the entire length of the core slot.

In operation of the machine a current flowing through the winding of a dynamolectric machine and through the conductor strands causes a flux around both in the core portion and in the end winding portion of the conductor. However, because each strand occupies each strand position for a substantially equal portion of the slot length, strand voltages due to core flux variations are substantially equalized. As the strands occupy strand positions which are reversed or rotated 180 degrees at the two ends of the core, the strand voltages due to variations in the end flux are also substantially equalized. By transposing with crossovers a single strand in depth in the second portion of the core length, the strands of each pair of strands are transposed with respect to each other and voltages between the strands of each pair are substantially equalized.

Since the increase in transposition rate through the first and fourth quarter is accomplished through using two strands for each crossover rather than by decreasing the relative distance between crossovers, the distance between crossovers remains equal throughout the core length. In this manner also the number of strand crossovers in the first and fourth quarter is reduced thereby permitting fewer crossovers along the length of the core slot. As the distance between strand crossovers is equal along the slot length, a minimum distance may be used for each crossover along the entire length of the core and greatly reduced core length may be used while retaining the advantages of the 540 degree transposition arrangement.

Although there is some sacrifice in core slot depth by using crossovers two strands in depth over a portion of the core length, the use of a 540 degree transposition arrangement more than compensates for this sacrifice and at the same time the minimum core length has been reduced to that formerly required for a 360 degree transposition arrangement and this permits the use of such a transposition arrangement for shorter core machines.

From the embodiment of this invention shown and described it will be apparent to one skilled in the art that various changes or modifications may be made therein without departing from the spirit of the invention or from the scope of the appended claims.

What is claimed is:

1. In a dynamoelectric machine, a core having an axial slot, an electrical conductor in said slot comprising a plurality of strands arranged in two columns, said strands being transposed by rotation to occupy each strand position in both of said columns for substantially equal lengths of the slot and to occupy inverse top to bottom positions at opposite ends of said slot, transposition crossovers between said columns being equally spaced along said slot.

2. In a dynamoelectric machine, a core having an axial slot, an electrical conductor in said slot comprising a plurality of strands arranged in two columns having an equal number of strands, said strands being transposed by rotation to occupy strand positions in both of said columns for substantially equal lengths of said slot and to occupy inverse top and bottom positions at opposite ends of said slot, transposition crossovers between said columns being equally spaced along said slot and at a rate in portions of said core length which is twice the rate of said transposition crossovers in the remainder of said slot length.

3. In a dynomoelectric machine, a core having an axial slot, an electrical conductor in said slot comprising a plurality of strands arranged in two columns having an equal number of strands, said strands being transposed uniformly by rotation through 180 degrees over a first portion of said slot length, through 180 degrees over a second portion of said slot length, through 180 degrees over a third portion of said slot length, transposition crossovers of said strands being equally spaced along said slot length.

4. In a dynamoelectric machine, a core having an axial slot, an electrical conductor in said slot comprising a plurality of strands arranged in two columns having an equal number of strands, said strands being transposed uniformly by rotation through 180 degrees over a first portion of said slot length, through 180 degrees over a second portion of said slot length, and through 180 degrees over a third portion of said slot length, the strand depth of said crossovers in said first and said third portions being twice the strand depth of said crossovers in the second portion of said slot length, said first and said third portions each extending through one-quarter of the length of said core slot.

5. In a dynamoelectric machine, a core having an axial slot, an electrical conductor in said slot comprising a plurality of strands arranged in two columns having an equal even number of strands, said strands being transposed uniformly by rotation through 180 degrees over a first portion of said slot length, through 180 degrees over a second portion of said slot length, and through 180 degrees over a third portion of said slot length, transposition crossovers of said strands being equally spaced along said slot length the strand depth of said crossovers in said first and said third portions being twice the strand depth of the crossovers in said second portions, said first and said third portions each extending through one-quarter of the length of said core slot.

6. In a dynamoelectric machine, a core having an axial slot, an electrical conductor in said slot comprising a plurality of strands arranged in two columns, said strands being transposed by rotation to occupy each strand position in both of said columns for substantially equal lengths of said slot and to occupy relative positions rotated 180 degrees at the opposite ends of said conductor, said strand transposition crossovers being equally spaced along the length of said core.

7. In a dynamoelectric machine, a core having an axial slot, an electrical conductor in said slot comprising a plurality of strands arranged in two columns, said strands being transposed by rotation to occupy each strand position in both of said columns for substantially equal lengths of said slot, and to occupy relative positions rotated 180 degrees at the opposite ends of said slot, transposition crossovers from one column to the other having a strand depth over portions of said slot length which is twice the strand depth of transposition crossovers in the remainder of said slot length.

8. In a dynamoelectric machine, a core having an axial slot, an electrical conductor in said slot comprising a plurality of strands arranged in two columns, said strands being transposed by rotation to occupy each strand position in both of said columns for substantially equal lengths of said slot and to occupy relative positions rotated 180 degrees at the opposite end of said conductor, strand transposition crossovers being equally spaced along the length of said core, transposition crossovers from one column to the other having a strand depth over portions of said slot length which is twice the strand depth of transposition crossovers in the remainder of said slot length.

9. In a dynamoelectric machine, a core having an axial slot, an electrical conductor in said slot comprising a plurality of strands arranged in two columns, said strands being transposed by rotation to occupy each strand position in both of said columns for substantially equal lengths of said slot and to occupy relative positions rotated 180 degrees at the opposite ends of said conductor, strand transposition crossovers being equally spaced along the length of said core, transposition crossovers from one column to the other having a strand depth over a one-quarter portion of said slot length at each end of said slot which is twice the strand depth of transposition crossovers in the remainder of said slot length.

10. In a dynamoelectric machine, a core having an axial slot, an electrical conductor in said slot comprising a plurality of strands arranged in two columns having an equal number of strands, said strands being transposed by rotation to occupy strand positions in both of said columns for substantially equal lengths of said slot and to occupy inverse top and bottom positions at opposite ends of said slot, said transposition crossovers being by strand pairs over a portion of said core length and said strands of each pair being transposed with respect to each other.

11. In a dynamoelectric machine, a core having an axial slot, an electrical conductor in said slot comprising a plurality of strands arranged in two columns having an equal number of strands, said strands being transposed uniformly by rotation through 180 degrees over a first portion of said slot length, through 180 degrees over a second portion of said slot length, through 180 degrees over a third portion of said slot length, said transposition crossovers being by strand pairs in said first and third portions and said strands of each pair being transposed with respect to each other in said second portion of said slot length.

12. In a dynamoelectric machine, a core having an axial slot, an electrical conductor in said slot comprising a plurality of strands arranged in two columns having an equal number of strands, said strands being transposed uniformly by rotation through 180 degrees over a first portion of said slot length, through 180 degrees over a second portion of said slot length, through 180 degrees over a third portion of said slot length, said transposition crossovers being by strand pairs in said first and third portions and said strands of each pair being transposed with respect to each other in said second portion of said slot length, said first and said third portions each being equal to one-quarter of the slot length.

No references cited.